United States
Schindler

3,814,501
June 4, 1974

[54] LIQUID-CRYSTAL DISPLAY DEVICE AND METHOD OF MAKING

[75] Inventor: Henry Claude Schindler, East Brunswick, N.J.

[73] Assignee: RCA Corporation, New York, N.Y.

[22] Filed: Dec. 4, 1972

[21] Appl. No.: 311,773

[52] U.S. Cl. ........................ 350/160 LC, 117/211
[51] Int. Cl. ............................................ G02f 1/16
[58] Field of Search ........................... 350/160 LC

[56] References Cited
UNITED STATES PATENTS
3,712,047  1/1973  Girard ..................... 350/160 LC X OTHER PUBLICATIONS
Gladstone et al., "Liquid Crystal Display Device," IBM Technical Disclosure Bulletin, Vol. 15, pp. 437–438, July 1972.

*Primary Examiner*—Edward S. Bauer

[57] ABSTRACT

Disposed on the inner surface of the rear substrate of the device are a plurality of rear electrodes, each made of a light-reflective electrically-conductive material, and a plurality of electrical leads extending therefrom. Directly opposite each rear electrode is an identically-shaped front electrode disposed on the inner surface of the front substrate and made of a transparent conductive material. The remainder of the inner surface of the front substrate is coated with a reflective conductive material. Preferably, the rear electrodes are formed by depositing aluminum or silver on positively-masked areas of the rear-substrate inner surface; and the front electrodes are formed by depositing a continuous coating of indium oxide or tin oxide on the front-substrate inner surface, and then depositing aluminum or silver on negatively-masked areas of the oxide coating.

5 Claims, 4 Drawing Figures

PATENTED JUN 4 1974　　　　　　　　　　　　　　　　　　　3,814,501

3,814,501

LIQUID-CRYSTAL DISPLAY DEVICE AND METHOD OF MAKING

BACKGROUND OF THE INVENTION

This invention relates to a novel liquid-crystal device having improved display characteristics and to a method of making the novel device.

A typical liquid-crystal display device comprises a pair of spaced-apart hermetically-sealed substrates and a liquid-crystal material therebetween. Each substrate has an electrode pattern on the inner surface thereof for activating, i.e., applying an electric field across, a region or regions of the liquid-crystal material. The unactivated regions of the liquid-crystal material are transparent; the activated regions, on the other hand, are dynamic scatterers of light. By suitable electrode design, the device can serve as a numeric display, operating in a transmissive or a reflective mode. In transmissive-mode operation, the device is illuminated from the rear. However, where rear illumination is unavailable, or undesirable becuase of power limitations, reflective-mode operation is employed. In reflective-mode operation, the device is illuminated from the front, using ambient or other available light. Devices employing reflective-mode operation find ready application in instruments such as meters and calculators.

In the usual form of construction of a liquid-crystal numeric device for reflective-mode operation, the rear-substrate electrode pattern comprises a continuous coating of a light-reflective electrically-conductive material such as aluminum or silver. The front-substrate electrode pattern comprises a plurality of numeric segments, each of which is made of a transparent conductive material such as indium oxide or tin oxide. Also disposed on the inner surface of the front substrate is a like plurality of electrical leads, each extending from an edge thereof to one of the numeric segments, and an additional lead extending from the edge of the front substrate to a bridging means in contact with the rear-substrate electrode. The leads are each made of a transparent conductive material. During operation of the device, regions of the liquid-crystal material immediately behind the numeric segments are activated in various combinations, by means of the electrical leads. Light incident on the outer or viewing surface of the front substrate then produces a luminous image of each combination of activating numeric segments against a mirrorlike background.

A major disadvantage of the form of construction described above is the need to prevent activation of the regions of the liquid-crystal material immediately behind the electrical leads. See, for example, H. C. Schindler, "Liquid-Crystal Dynamic Scattering for Display Devices," *RCA Engineer*, vol. 17, no. 6, pp. 35–39 (1972). Thus, a known method of making the device in the usual form comprises masking off the rear-substrate inner-surface areas opposite the electrical leads, during the rear-electrode continuous-coating step. However, this method involves often-complex topological-layout problems. Also, the device fails to display a full mirror-like background for the luminous numeric images. Hence, another known method of making the device in the usual form comprises coating the entire inner surface of the rear substrate with a reflective conductive material, and then forming isolation lines in the continuous coating to electrically isolate the coated areas opposite the electrical leads. However, this alternate method produces viewing problems inasmuch as the isolation lines are always visible.

In another form of construction of a liquid-crystal numeric device for reflective-mode operation, the rear-substrate electrode pattern comprises a plurality of numeric segments, each of which is made of a reflective conductive material; and the front-substrate electrode pattern comprises a corresponding, i.e., oppositely-disposed and identically-shaped plurality of numeric segments, each of which is made of a transparent conductive material. Typically, the rear substrate numeric segments are interconnected to form a common electrode, and the common electrode and front substrate numeric segments are individually connected to a suitable plurality of electrical leads disposed on the front substrate; the leads are each made of a transparent conductive material. To provide a continuous mirrorlike background for the various luminous images of the numeric segments, the entire outer surface of the rear substrate is coated with a reflective material. However, a major disadvantage of this form of construction is the parallax caused by the thickness of the rear substrate, typically about 60 mils, separating the images from their background. See, for example, U.S. Pat. No. 3,612,654, issued to R. I. Klein et al. on Oct. 12, 1971.

In yet another form of construction of a liquidcrystal numeric device for reflective-mode operation, the parallax problem is essentially eliminated by coating the entire inner surface of the rear substrate with first, a layer of reflective material, and second, a thin layer of transparent insulative material, on which is then disposed the rear-substrate electrode pattern described immediately above. The front-substrate electrode pattern and electrical leads are disposed directly on the inner surface of the front substrate as previously described. Typically, the transparent insulator layer is made of silicon oxide or silicon nitride, and its thickness is of the order of 2,000 A. This latter form of construction is compatible with d-c operation of the device, i.e., operation for which a d-c voltage source is employed to activate appropriate regions of the liquid-crystal material; see U.S. Pat. No. 3,612,654 supra. However, problems of a-c coupling are encountered when an a-c voltage source is employed in the operation. For example, regions of the liquid-crystal material not intended to be activated are nevertheless activated during a-c operation, as a result of the coupling through the transparent insulator layer.

SUMMARY OF THE INVENTION

The novel liquid-crystal device comprises a front transparent substrate having an inner surface, at least one portion of which has a transparent conductive material thereon and the remainder of which has a reflective material thereon; and a rear substrate having an inner surface, a portion of which corresponds, i.e., is oppositely-disposed and identically-shaped, to the one portion of the front-substrate inner surface and has a reflective conductive material thereon. Preferably, each of a plurality of portions of the front-substrate inner surface has a transparent conductive material thereon; and each of a plurality of portions of the rear-substrate inner surface, corresponding to one of the portions of the front-substrate inner surface, has a reflective conductive material thereon.

The method of making the novel liquid-crystal device comprises coating at least one portion of the inner surface of a front transparent substrate with a transparent conductive material and the remainder thereof with a reflective material; and coating a portion of the inner surface of a rear substrate, corresponding to the one portion of the front-substrate inner surface, with a reflective conductive material. Preferably, the front-substrate inner surface is first coated entirely with the transparent conductive material, afterwhich the reflective material is deposited on a suitably-negatively-masked area or areas of the transparent conductive coating; and the reflective conductive material is deposited directly on a suitably-positively-masked area or areas of the rear-substrate inner surface.

DESCRIPTION OF THE PREFERRED EMBODIMENTS

Figure 1:
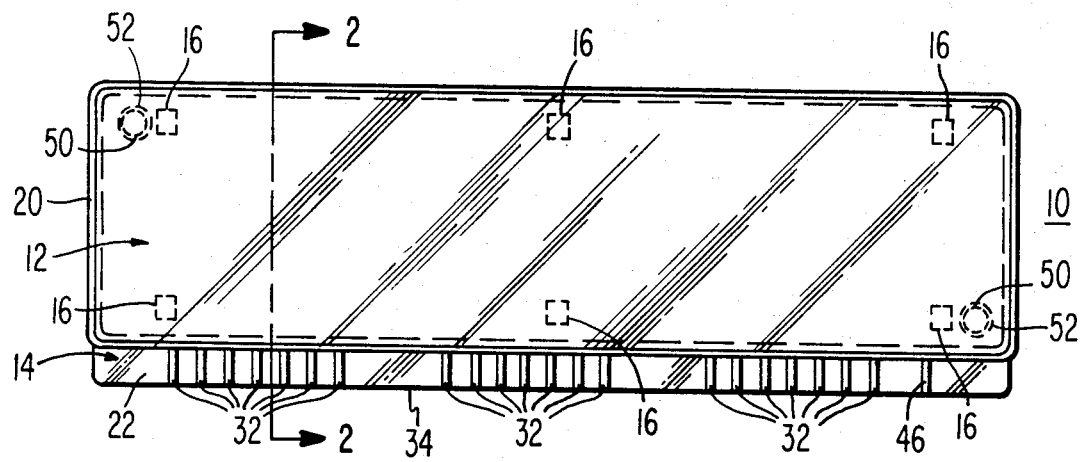
FIG. 1 is a front view of an example of the novel device, including a front substrate and a rear substrate.
Figure 2:
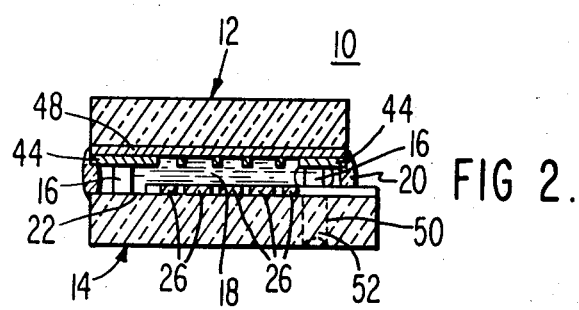
FIG. 2 is a sectional view, along the line 2—2 of the device of FIG. 1.

The following is an example of the novel device. As shown in FIGS. 1 and 2, a liquid-crystal display device 10 comprises a front transparent-glass substrate 12 and a rear transparent-glass substrate 14. The substrates 12 and 14 are maintained in spaced-apart relationship by means of plurality of mica spacers 16 disposed inwardly of the edges of the substrates. Typically, the spacers 16 are each about 0.5 mil thick and approximately 40 mils by 40 mils square. The substrates 12 and 14 are each about 60 mils thick and generally rectangular in shape, the rear substrate 14 being slightly wider than, i.e., projecting beyond, the front substrate 12. Sandwiched between the substrates 12 and 14 is a liquid-crystal material 18, which may be any one of the various known types. The liquid-crystal material 18 is retained within the substrate interspace by a hermetic glass-frit seal 20 disposed between the substrates 12 and 14, mostly along the edges thereof.

Figure 3:
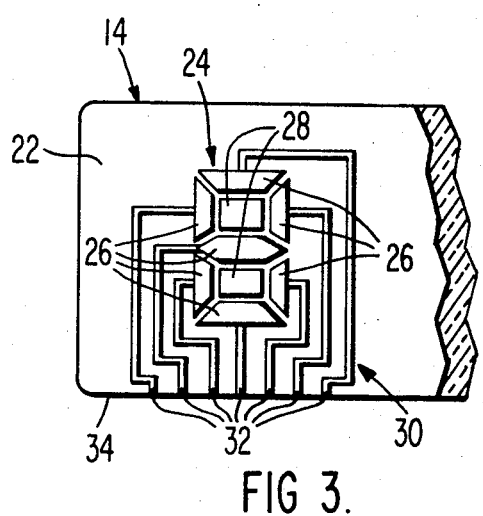
FIG. 3 is a plane view of the inner surface of a portion of the rear substrate of FIG. 1.

Disposed on the inner surface 22 of the rear substrate 14 is a rear electrode pattern 24. Referencing FIG. 1, the left-most portion of the rear substrate 14 is shown in FIG. 3, wherein the rear electrode pattern 24 comprises seven closely-spaced numeric activating segments 26, various combinations of which simulate the digits from 0 to 9, surrounding a pair of non-activating segments 28. The activating and non-activating segments 26 and 28, respectively, are each made of a light-reflective electrically-conductive material such as aluminum. Also disposed on the inner surface 22 of the rear substrate 14 is an electrical lead pattern 30. As shown in FIG. 3, the electrical lead pattern 30 comprises seven electrical leads 32, each of which extends from one of the activating segments 26 to the long edge 34 of the projecting portion of the rear substrate 14. The electrical leads 32 are each made of aluminum or a transparent conductive material such as indium oxide.

Figure 4:
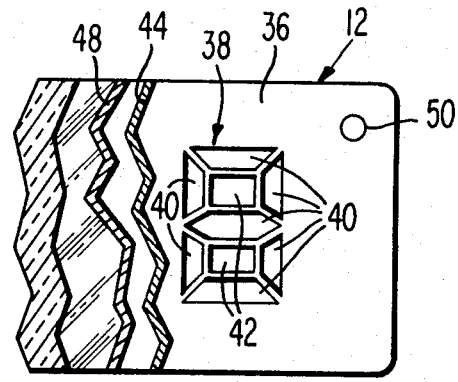
FIG. 4 is a plane view of the inner surface of a portion of the front substrate of FIG. 1.

Disposed on the inner surface 36 of the front substrate 12 is a front electrode pattern 38. Referencing FIG. 1, the left-most portion of the front substrate 12 is shown in FIG. 4, wherein the front electrode pattern 38 comprises seven activating segments 40 and a pair of non-activating segments 42 corresponding to the activating segments 26 and non-activating segments 28, respectively, of the rear electrode pattern 24. That is, the front and rear electrode patterns 38 and 24, respectively, comprise oppositely-disposed and identically-shaped activating segments 40 and 26, respectively, and oppositely-disposed and identically-shaped non-activating segments 42 and 28, respectively. The activating and non-activating segments 40 and 42, respectively, of the front electrode pattern 38 are each made of indium oxide. The remainder of the inner surface 36 of the front substrate 12, i.e., the portion thereof not having the front electrode pattern 38 disposed thereon, is coated with a layer 44 of aluminum.

As shown in FIG. 1, the portions of the rear electrode pattern 24 and front electrode pattern 38 shown in FIGS. 3 and 4, respectively, are iterated across their respective substrate surfaces to permit a three-digit display. Also iterated across the inner surface 22 of the rear substrate 14 is the portion of the electrical lead pattern 30 shown in FIG. 3. An additional electrical lead 46, made of the same material as that of the electrical leads 32, is disposed on the right-most portion of the rear substrate 14. The electrical lead 46 extends from the edge 34 of the rear substrate 14 to a metal tab (not shown), which bridges the substrate interspace and is in direct contact with the aluminum layer 44 on the inner surface 36 of the front substrate 12.

During operation of the device 10, various ones of the electrical leads 32, on one hand, and the electrical lead 46, on the other hand, are connected to an appropriate a-c or d-c voltage source (not shown) to activate those regions of the liquid-crystal material 18 adjacent to the various rear-electrode activating segments 26 (and their corresponding front-electrode activating segments 40) selected to be displayed. Light incident on the outer, i.e., viewing, surface of the front substrate 12 then produces a luminous image of each such selected segment 26 (and corresponding segment 40) against a full mirrorlike background, the latter comprising the aluminum layer 44 disposed on the front-substrate inner surface 36, the non-activating (aluminum) segments 28 disposed on the rear-substrate inner surface 22, and the unselected activating (aluminum) segments 26 also disposed on the surface 22. No luminous image of any of the electrical leads 32 and 46 is produced, because of the disposition of the aluminum layer 44. Also, the topological-layout, isolation-line, parallax, and a-c coupling problems of prior devices are eliminated.

The following is an example of the method of making the liquid-crystal display device 10. The front electrode pattern 38 is produced on the inner surface 36 of the front transparent-glass substrate 12 by first coating the entire surface 36 with a layer 48 of indium oxide, shown in FIG. 2. The indium oxide layer 48 is typically deposited to a thickness of the order of 2,000 A. Then, a suitable negative mask (not shown) is employed to deposit the aluminum layer 44 on that portion of the indium oxide layer 48 not comprising the activating segments 40 and non-activating segments 42 of the front electrode pattern 38. The thickness of the aluminum layer 44 is typically of the order of 3,000 A.

A suitable positive mask (not shown), keyed to the negative mask used to produce the front electrode pattern 38, is employed to deposit the aluminum activating segments 26 and non-activating segments 28 of the rear electrode pattern 24 directly on the inner surface 22 of the rear substrate 14. The electrical lead pattern 30, comprising the electrical leads 32, and the electrical lead 46 may be simultaneously deposited on the inner surface 22 of the rear substrate 14, using the same positive mask. Alternatively, a separate keyed positive mask may be employed to produce the electrical lead 32 and 46, either from deposits of aluminum or indium oxide.

The front substrate 12 and the rear substrate 14 are then assembled in spaced-apart relationship, by means of the mica spacers 16, such that their inner surfaces 36 and 22, respectively, face one another and their electrode patterns 38 and 24, respectively, are in mutual correspondence. Next, the substrates 12 and 14 are hermetically sealed mainly along the edges thereof, using well-known glass-frit sealing techniques, to produce the seal 20. The substrate interspace is then filled with the liquid-crystal material 18 by employing a pair of metal tubulations (not shown) in interim communication with a pair of diagonally-opposed cylindrical holes 50 formed through the thickness of the rear substrate 14, as shown in FIGS. 1 and 2. The remote ends of the tubulations are connected one to a source of the liquid-crystal material 18 and the other to a source of vacuum (both sources not shown). Simultaneous operation of the two sources facilitates complete filling of the substrate interspace, as well as the holes 50, with liquid-crystal material. Following the filling step, the tubulations are removed from the rear substrate 14 and the device 10 is then closed by forming suitable plugs 52 in the holes 50. Typical such closure methods are described in U.S. Pat. application Ser. No. 286,249 filed on Sept. 5, 1972 by H. A. Stern; and U.S. Pat. application Ser. No. 286,250, filed on Sept. 5, 1972, by A. N. Gardiner et al.

GENERAL CONSIDERATIONS

It should be understood that the invention is not limited to the examples described above. Thus, the substrate and electrode geometries may be other than those shown in FIGS. 1 to 4. For example, the electrode pattern may comprise alphabetic in addition to, or instead of, numeric and/or other types of character segments. Also, the substrate, electrode, and background materials may be other than those named. For example, the rear substrate need not be transparent; the rear electrode segments may be made of a reflective conductive material other than aluminum, such as silver; the front electrode segments may be made of a transparent conductive material other than indium oxide, such as tin oxide; and the remainder of the front-substrate inner surface may be coated with silver, instead of aluminum. Alternatively, the remainders of the front-and rear-substrate inner surfaces may be coated with a reflective insulative material and a conductive material, respectively, the electrical lead pattern being disposed on the reflective insulative material. Furthermore, the electrode and electrical lead patterns may be produced by any one of the various known printing, e.g., masking and etching, techniques.

What is claimed is:

1. A liquid-crystal display device comprising a front transparent substrate, a rear substrate, and a liquid-crystal material therebetween,
   a. said front substrate having an inner surface, at least one portion of which has a transparent conductive material thereon and the remainder of which has a reflective material thereon; and
   b. a reflective conductive material on the inner surface of said rear substrate having the same configuration as and being aligned with said one portion of said front-substrate inner surface.

2. The device of claim 1, comprising on said rear-substrate inner surface a conductive material extending from said reflective conductive material.

3. A liquid-crystal display device comprising a front transparent substrate, a rear substrate, and a liquidcrystal material therebetween,
   a. said front substrate having an inner surface, each of a plurality of discrete portions of which has a transparent conductive material thereon and the remainder of which has a reflective material thereon; and
   b. a plurality of reflective conductive material portions on the inner surface of said rear substrate each having the same configuration as and being aligned with a different one of said discrete portions of said front-substrate inner surface.

4. The device of claim 3, wherein each of at least two of said reflective conductive material portions on said rear-substrate inner surface has the shape of a character segment.

5. The device of claim 4, wherein at least two conductive leads, each in contact with a different one of said character-segment-shaped portions, are also disposed on said rear-substrate inner surface.

* * * * *